United States Patent
Lee et al.

(10) Patent No.: US 10,471,850 B2
(45) Date of Patent: Nov. 12, 2019

(54) SYSTEM AND METHOD FOR CONTROLLING ROTATING TYPE SEAT OF SELF-DRIVING VEHICLE

(71) Applicants: Hyundai Motor Company, Seoul (KR); Kia Motors Corporation, Seoul (KR)

(72) Inventors: Baek Hee Lee, Gyeonggi-Do (KR); Min Hyuk Kwak, Seoul (KR); Jin Hee Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 15/821,990

(22) Filed: Nov. 24, 2017

(65) Prior Publication Data

US 2019/0084447 A1  Mar. 21, 2019

(30) Foreign Application Priority Data

Sep. 18, 2017 (KR) .................. 10-2017-0119440

(51) Int. Cl.
*B60N 2/02* (2006.01)
*B60N 2/18* (2006.01)
*B60N 2/22* (2006.01)
*B60N 2/90* (2018.01)

(52) U.S. Cl.
CPC .............. *B60N 2/0244* (2013.01); *B60N 2/18* (2013.01); *B60N 2/22* (2013.01); *B60N 2/99* (2018.02); *B60N 2002/0268* (2013.01)

(58) Field of Classification Search
CPC .......... B60N 2/0244; B60N 2/99; B60N 2/18; B60N 2/22; B60N 2002/0268
See application file for complete search history.

(56) References Cited

U.S. PATENT DOCUMENTS

| | | | |
|---|---|---|---|
| 7,987,032 B2* | 7/2011 | Uenunna | B60N 2/0232 701/49 |
| 9,744,932 B1* | 8/2017 | Faruque | B60R 21/16 |
| 9,815,388 B1* | 11/2017 | Lindsay | B60N 2/0244 |
| 9,950,708 B1* | 4/2018 | Cullinane | B60W 30/095 |
| 2004/0129478 A1* | 7/2004 | Breed | B60N 2/002 180/273 |
| 2015/0142245 A1* | 5/2015 | Cuddihy | B60N 2/143 701/23 |
| 2017/0028876 A1* | 2/2017 | Yamada | B60N 2/012 |
| 2017/0050538 A1* | 2/2017 | Akimoto | B60N 2/0244 |
| 2017/0101032 A1* | 4/2017 | Sugioka | B60N 2/763 |
| 2017/0267204 A1* | 9/2017 | Farooq | B60N 2/14 |
| 2017/0361802 A1* | 12/2017 | Farooq | B60N 2/01 |
| 2018/0201213 A1* | 7/2018 | Gandhi | B60N 2/0276 |
| 2018/0272977 A1* | 9/2018 | Szawarski | B60R 21/01512 |
| 2018/0281627 A1* | 10/2018 | Ali | B60N 2/0276 |
| 2018/0356897 A1* | 12/2018 | Hoggarth | B62D 47/003 |

* cited by examiner

*Primary Examiner* — Calvin Cheung
(74) *Attorney, Agent, or Firm* — Mintz Levin Cohn Ferris Glovsky and Popeo, P.C.; Peter F. Corless (57) ABSTRACT

A system and a method are provided for controlling a rotating type seat of a self-driving vehicle. In particular, seat position and bolster volume are adjusted based on a pressure rate in response to a vehicle turning when seat of the self-driving vehicle is rotationally adjusted in a desired direction. Accordingly, body displacement due to a centrifugal force and inertia is supported and a stable seating feeling is provided to the passenger.

16 Claims, 9 Drawing Sheets

FIG. 1A

PRIOR ART

◠↺ : SEAT ROTATION
→ : VIEWING DIRECTION OF SEATED PASSENGER

FIG. 1B

PRIOR ART

◠↺ : SEAT ROTATION
→ : VIEWING DIRECTION OF SEATED PASSENGER

| No. | TURNING PHASE DETERMINING CONDITION (θ = SEAT ROTATION ANGLE; NO OPERATION AT 90°, 270°) | | SEAT CONTROL OPERATION STATUS (Fail-Safe) | APPLIED PHASE | DETERMINING REASON | |
|---|---|---|---|---|---|---|
| | CORRECTED LATERAL ACCELERATION (G) | SEAT BACK BOLSTER PORTION BODY PRESSURE OCCURRENCE RATE (%) | | | DRIVER MOVEMENT | POSTURE STABILITY |
| 1 | < 0.1 | < 20 x \|cosθ\| | X | 0 | - | - |
| 2 | < 0.1 | (20 x \|cosθ\|) ~ (30 x \|cosθ\|) | X | 0 | Light | - |
| 3 | < 0.1 | ≥ 30 x \|cosθ\| | X | 0 | Rough | - |
| 4 | 0.1 ~ 0.6 | < 20 x \|cosθ\| | X | - | - | High |
| 5 | 0.1 ~ 0.6 | (20 x \|cosθ\|) ~ (30 x \|cosθ\|) | O | 1 | - | - |
| 6 | 0.1 ~ 0.6 | ≥ 30 x \|cosθ\| | O | 2 | - | Very Low |
| 7 | ≥ 0.6 | < 20 x \|cosθ\| | X | - | - | Very High |
| 8 | ≥ 0.6 | (20 x \|cosθ\|) ~ (30 x \|cosθ\|) | O | 1 | - | High |
| 9 | ≥ 0.6 | ≥ 30 x \|cosθ\| | O | 2 | - | - |

EMBODIMENT 1) SEAT ROTATION ANGLE, CORRECTED LATERAL ACCELERATION,
BODY PRESSURE OCCURRENCE RATE, OPERATION X

| No. | TURNING PHASE DETERMINING CONDITION | | SEAT CONTROL OPERATION STATUS (Fail-Safe) | PHASE DETERMINATION | DETERMINING REASON | |
|---|---|---|---|---|---|---|
| | CORRECTED LATERAL ACCELERATION (G) | SEAT BACK BOLSTER PORTION BODY PRESSURE OCCURRENCE RATE (%) | | | DRIVER MOVEMENT | POSTURE STABILITY |
| 1 | < 0.1 | < 20 | X | 0 | - | - |
| 2 | < 0.1 | 20 ~ 30 | X | 0 | Light | - |
| 3 | < 0.1 | ≥ 30 | X | 0 | Rough | - |

FIG. 10

EMBODIMENT 2) SEAT ROTATION ANGLE, CORRECTED LATERAL ACCELERATION,
BODY PRESSURE OCCURRENCE RATE, PHASE 2 LOGIC OPERATION

| No. | TURNING PHASE DETERMINING CONDITION | | SEAT CONTROL OPERATION STATUS (Fail-Safe) | PHASE DETERMINATION | DETERMINING REASON | |
|---|---|---|---|---|---|---|
| | CORRECTED LATERAL ACCELERATION (G) | SEAT BACK BOLSTER PORTION BODY PRESSURE OCCURRENCE RATE (%) | | | DRIVER MOVEMENT | POSTURE STABILITY |
| 4 | 0.1 ~ 0.6 | < 10 | X | - | - | High |
| 5 | 0.1 ~ 0.6 | 10 ~ 15 | O | 1 | - | - |
| 6 | 0.1 ~ 0.6 | ≥ 15 | O | 2 | - | Very Low |

SYSTEM AND METHOD FOR CONTROLLING ROTATING TYPE SEAT OF SELF-DRIVING VEHICLE

CROSS-REFERENCE TO RELATED APPLICATION

This application claims under 35 U.S.C. § 119(a) the benefit of priority to Korean Patent Application No. 10-2017-0119440 filed on Sep. 18, 2017, the entire contents of which are incorporated herein by reference.

BACKGROUND

(a) Technical Field

The present invention relates to a system and a method for controlling a rotating type seat of a self-driving vehicle and more particularly, to a system and a method for controlling a rotating type seat of a self-driving vehicle capable of providing a passenger with a more stable seating feeling despite a generated centrifugal force and inertia when turning the vehicle even when a seat of the self-driving vehicle is rotationally adjusted in passenger's desired direction.

(b) Background Art

As well known, driver and passenger bodies are displaced due to occurrence of the centrifugal force and inertia when the vehicle is turned while driving a vehicle toward the direction that a centrifugal force and inertia occur, thereby reducing driver's operating stability and not stabilizing passenger's seating feeling (e.g., comfort on a seat within the vehicle).

Even though the same centrifugal force and inertia occur when turning the vehicle, the degrees of body displacement and instability of operating posture may vary based on driver's operating posture and physical condition. Additionally, the posture of a user affects the amount support received from the seat which thus affects the degree of body displacement when the vehicle is turned.

Figure 1A:
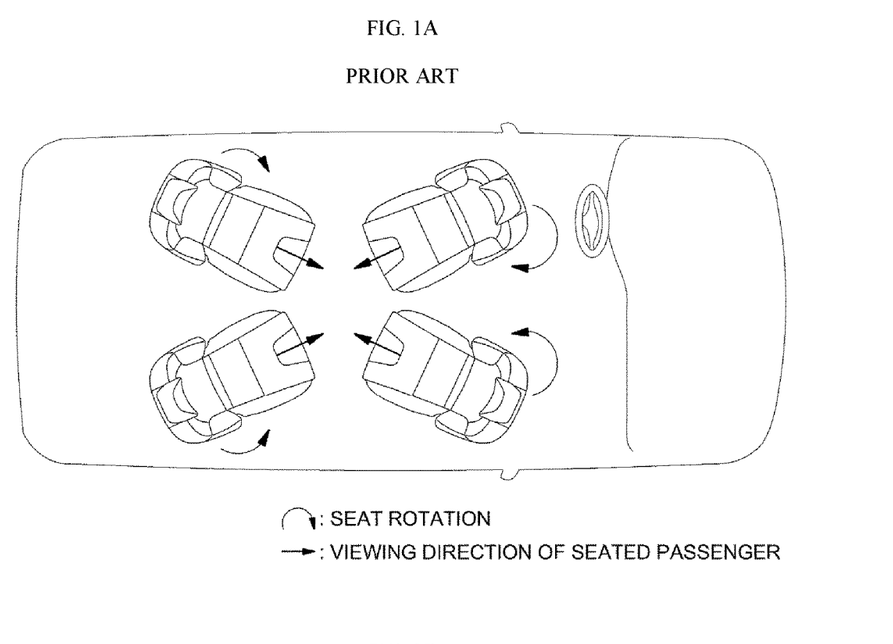
FIGS. 1A and 1B are schematic views illustrating examples of a rotation angle adjustment of a rotating type seat mounted in a self-driving vehicle according to the prior art.
Figure 1B:
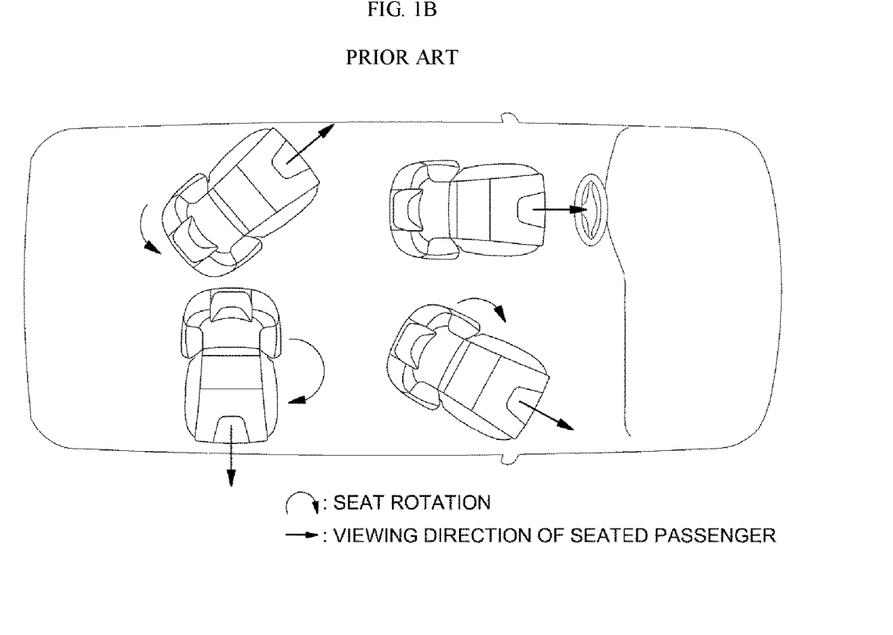

Meanwhile, in a self-driving vehicle capable of driving without driver's operation, for the purpose of multi-party conference and dialogue seated in an interior thereof, viewing exterior landscape, sleeping, and the like, a rotating type seat is provided which may rotationally adjust an angle of the seat in the desired direction. For example, the rotating type seat, which may, for the purpose of a face-to-face conference and dialogue between passengers seated in the vehicle, as illustrated in the accompanying FIG. 1A, rotationally adjust a first column seat in the rear direction or rotationally adjust a second column seat at certain angle; and also, as illustrated in the accompanying FIG. 1B, for the purpose of viewing exterior landscape, rotationally adjust the seat at certain angle toward an exterior direction, may be mounted in the self-driving vehicle.

As described above, when the rotating type seats are rotationally adjusted at each different angle in driver and passenger's desired directions, directions of a centrifugal force and inertia, which operate on each seat upon turning of the self-driving vehicle, are varied and thus, the degree of displacement of the passenger seated in each seat is also varied. In other words, when the rotating type seats are rotationally adjusted at each different angle in driver and passenger's desired directions, some passengers may have a greater degree of body displacement than others in response to the vehicle being turned. Accordingly, it is preferable to stably support passenger's body regardless of the rotationally adjusted position of the rotating type seat mounted in the self-driving vehicle and to provide comfort and a stable seating feeling to the passenger at all times.

The above information disclosed in this section is merely for enhancement of understanding of the background of the invention and therefore it may contain information that does not form the prior art that is already known in this country to a person of ordinary skill in the art.

SUMMARY

The present invention provides a system and a method for controlling a rotating type seat of a self-driving vehicle capable of adjusting seat position and bolster volume based on a passenger's body pressure rate in response to turning of the vehicle when a seat of the self-driving vehicle is rotationally adjusted in passenger's desired direction, thereby supporting body displacement due to a centrifugal force and inertia and providing a stable seating feeling to the passenger.

One implemented example of the present invention for achieving the object provides a system for controlling a rotating type seat of a self-driving vehicle that may include a driving information analyzing unit configured to obtain vehicle information and calculate a corrected lateral acceleration; a measuring unit configured to measure an amount of pressure exerted onto a seat back and a seat cushion from a body pressure measuring sensor and measure a seat rotation angle; a body pressure information analyzing unit configured to measure bolster body pressure occurrence rates of the seat back and the seat cushion based on the body pressure information supplied from the measuring unit; a turning phase determining unit configured to determine the turning degree of a vehicle using the seat rotation angle, the corrected lateral acceleration, and the bolster body pressure occurrence rate; and a seat controller configured to adjust a left/right inclined angle of the seat cushion and bolster volume and angle of the seat back based on the turning degree determined in the turning phase determining unit.

Additionally, the body pressure measuring sensor may be disposed between a cover of the seat back and a foam pad and may include a first body pressure measuring sensor that is configured as a structure that the body pressure sensor is attached to a flexible mat in a 3×3 arrangement and that is embedded with one pair at upper, middle, and lower locations, respectively, on a front center portion of the seat back and embedded with one pair at a front side and a rear side, respectively, on a center portion of the seat cushion; a second body pressure measuring sensor that is configured as a structure that the body pressure sensor is attached to the flexible mat in a 2×3 arrangement and that is embedded with one pair at upper, middle, and lower locations, respectively, on bolsters of both sides of a front surface of the seat back; and a third body pressure measuring sensor that is configured as a structure that the body pressure sensor is attached to the flexible mat in a 2×2 arrangement and that is embedded at a front side and a rear side, respectively, on bolsters of both sides of the seat cushion.

Further, a rotation angle sensing sensor may be configured to measure the seat rotation angle and may be mounted on a rotation center shaft of a seat or surroundings thereof, or a gyro sensor may be mounted on the seat and configured to measure azimuth variation of the seat. Additionally, the turning phase determining unit may be configured to determine a current driving status of a vehicle as Phase 0 (no turning), Phase 1 (proper turning), and Phase 2 (excessive turning or sharp turn) using three inputs of the seat rotation angle, the corrected lateral acceleration calculated using current information of a vehicle speed, a steering angle, and a yaw rate, and the bolster body pressure occurrence rate to provide the information to the seat controller.

The seat controller, in response to receiving Phase 1 (proper turning) or Phase 2 (excessive turning), may be configured to apply a control signal to a left/right inclined angle adjustment device of the seat cushion and raise one end portion of the seat cushion applied with body pressure. Accordingly, the seat controller, in response to receiving the Phase 1 (proper turning) or Phase 2 (excessive turning), may be configured to apply a control signal to a bolster left/right angle adjustment device embedded in the bolster of the seat back and perform angle adjustment of the bolster in an opposite direction applied with body pressure; and at the same time, apply a control signal to an air pressure supply device configured to supply air pressure to a plurality of air cells embedded in the bolster and uniformly perform pressure adjustment on each air cell at a predetermined rate.

Another implemented example of the present invention for achieving the object provides a method for controlling a rotating type seat of a self-driving vehicle that may include calculating a corrected lateral acceleration; measuring an amount of pressure exerted onto a seat back and a seat cushion using a body pressure measuring sensor and measure a seat rotation angle; calculate bolster body pressure occurrence rates of the seat back and the seat cushion based on body pressure information; determining the degree of turning of a vehicle using information of the seat rotation angle, the corrected lateral acceleration, and the bolster body pressure occurrence rate and determining current turning degree of the vehicle as Phase 0 (no turning), Phase 1 (proper turning), and Phase 2 (excessive turning) to provide the information to a seat controller; and adjusting a left/right inclined angle of the seat cushion and bolster volume and angle of the seat back based on the determined turning degree.

In particular, the corrected lateral acceleration may include multiplying a vehicle speed and a yaw rate to calculate an estimated lateral acceleration and then the calculated estimated lateral acceleration may be multiplied by a correction factor. The correction factor may be obtained by dividing the estimated lateral acceleration by the actually measured lateral acceleration. Further, when a body pressure sensing rate sensed in all of body pressure sensors embedded in the seat back is 100%, the body pressure sensing rate may be calculated by a rate that the body pressure sensing rate sensed in the body pressure sensor embedded in the bolster occupies.

When the seat controller receives Phase 0 (no turning), no a seat control may be performed. However, when the seat controller receives Phase 1 (proper turning), the left/right inclined angle of the seat cushion and the bolster volume and angle of the seat back may be adjusted so that current body pressure occurrence rates operating on the bolster portions of the seat back and the seat cushion become less than a first threshold bolster body pressure occurrence rate varying according to a lateral acceleration.

The first threshold bolster body pressure occurrence rate on the bolster portion of the seat back and the first threshold bolster body pressure occurrence rate on the bolster portion of the seat cushion may be obtained by inputting current lateral acceleration to a regression equation in statistics, respectively. The first threshold bolster body pressure occurrence rate on the bolster portion of the seat back may set as a range of a minimum about 20% to a maximum about 50% according to the lateral acceleration and the first threshold bolster body pressure occurrence rate on the bolster portion of the seat cushion may set as a range of a minimum about 20% to a maximum about 30% according to the lateral acceleration.

When the seat controller receives Phase 2 (excessive turning), the controller may be configured to adjust the left/right inclined angle of the seat cushion and the bolster volume and angle of the seat back so that current body pressure occurrence rates operating on the bolster portions of the seat back and the seat cushion become less than a second threshold bolster body pressure occurrence rate. The second threshold bolster body pressure occurrence rate on the bolster portion of the seat back may set as about 50% and the second threshold bolster body pressure occurrence rate on the bolster portion of the seat cushion may be set as about 30%.

Further, the left/right inclined angle of the seat cushion may be adjusted by a control for raising one end portion of the seat cushion applied with body pressure. The bolster angle adjustment of the seat back may include adjusting an angle of the bolster in an opposite direction applied with body pressure and the bolster volume adjustment of the seat back may be performed by uniformly adjusting air pressure on a plurality of air cells embedded in the bolster at a predetermined rate.

Through the above embodiments, the present invention provides the following effects.

Even though passenger's body is displaced when a vehicle is turned while being driven and the seat of the self-driving vehicle is rotationally adjusted in passenger's desired direction, it may be possible to adjust seat position and bolster volume based on the amount of pressure exerted on the seat, thereby supporting and minimizing body displacement due to a centrifugal force and inertia and eventually, providing a stable seating feeling to the passenger regardless of the rotated direction of the seat upon turning driving of the self-driving vehicle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2A:
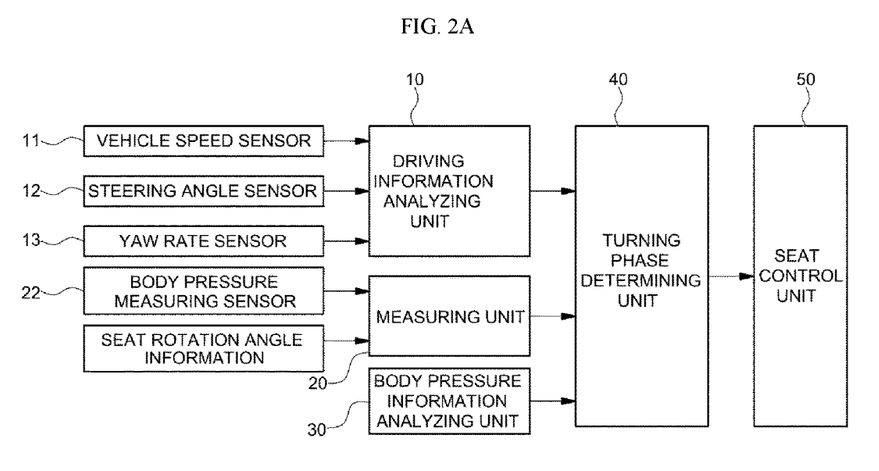
FIGS. 2A and 2B are configuration views illustrating a system for controlling the rotating type seat of the self-driving vehicle according to an exemplary embodiment of the present invention.

A system for controlling a rotating type seat of a self-driving vehicle according to the present invention, as illustrated in a configuration view of the accompanying FIG. 2A, may include a driving information analyzing unit 10, a measuring unit 20, a body pressure information analyzing unit 30, a turning phase determining unit 40, a seat controller 50, and the like. The controller 50 may be configured to operate the various units of the system. Additionally, the driving information analyzing unit 10 may be configured to calculate a corrected lateral acceleration using current information of a vehicle speed signal received from a vehicle speed sensor 11 of the self-driving vehicle, a steering angle signal received from a steering angle sensor 12, and a yaw rate received from a yaw rate sensor 13.

Figure 4:
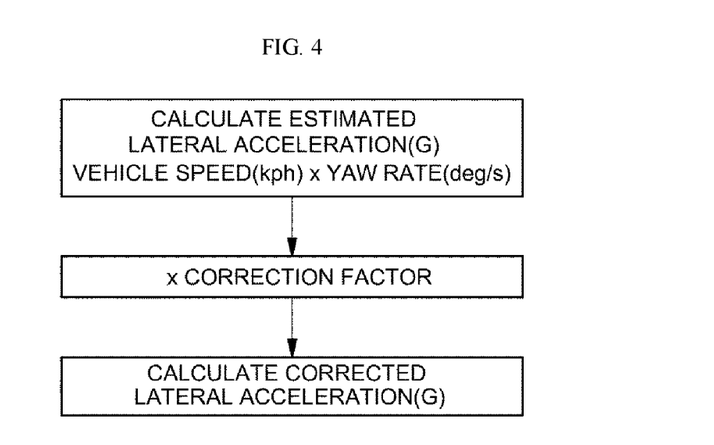
FIG. 4 is a flowchart illustrating an example of calculating a corrected lateral acceleration in a driving information analyzing unit of the system for controlling the rotating type seat of the self-driving vehicle according to an exemplary embodiment of the present invention.
Figure 5:
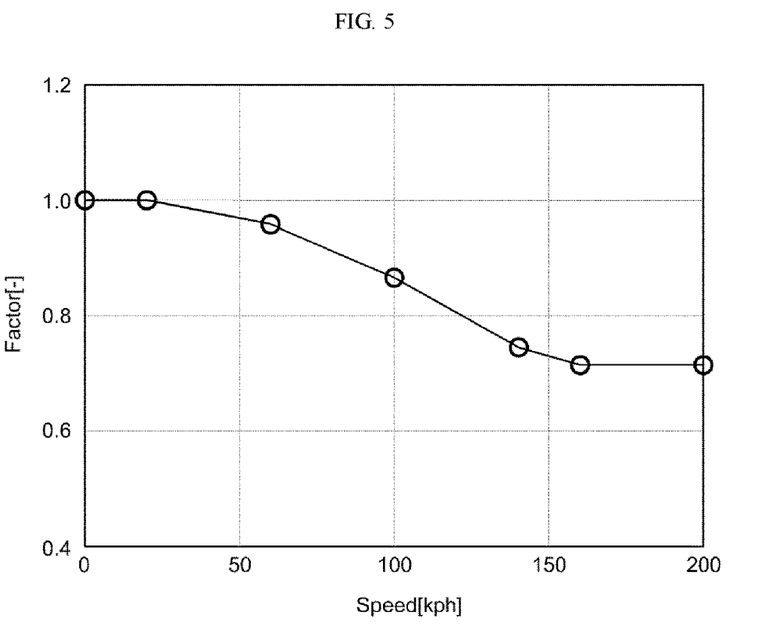
FIG. 5 is a graph illustrating a correction factor for calculating the corrected lateral acceleration in the driving information analyzing unit of the system for controlling the rotating type seat of the self-driving vehicle according to an exemplary embodiment of the present invention.

A method for calculating the corrected lateral acceleration, as illustrated in the accompanying FIG. 4, may include multiplying the vehicle speed received from the vehicle speed sensor 11 and the value of the yaw rate received from the yaw rate sensor 13 to calculate an estimated lateral acceleration, and then multiplying the calculated estimated lateral acceleration by a correction factor to calculate the corrected lateral acceleration. In particular, the correction factor may be obtained by dividing the estimated lateral acceleration by a measured lateral acceleration measured in an actual experiment step; and as illustrated in the accompanying FIG. 5, as the vehicle speed increases, the correction factor decreases.

Figure 6:
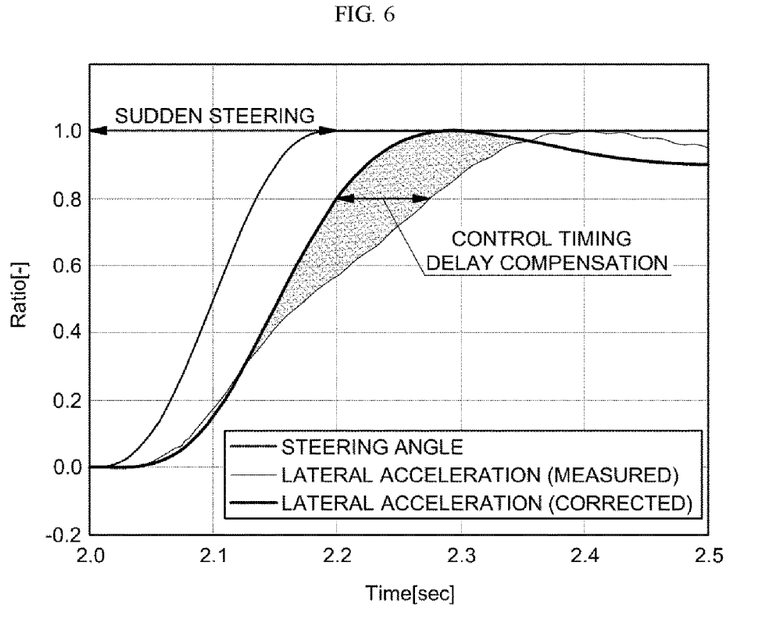
FIG. 6 is a graph illustrating that a seat control timing is corrected according to the corrected lateral acceleration calculated in the driving information analyzing unit of the system for controlling the rotating type seat of the self-driving vehicle according to an exemplary embodiment of the present invention.

Accordingly, as illustrated in the accompanying FIG. 6, when the steering angle signal obtained from the steering angle sensor 12 is determined to be sudden steering (e.g., a rapid control of the steering wheel or a sharp turn), the corrected lateral acceleration has a profile at an earlier timing than that of the actually measured lateral acceleration, thereby compensating delay of the seat control timing by a seat controller as described later. Thus, the corrected lateral acceleration in the driving information analyzing unit 10 may be calculated to remove noise contained in a signal of an acceleration level to increase the accuracy of the lateral acceleration detection and to prevent phenomenon that a value of the estimated lateral acceleration is incorrectly calculated compared to the actual lateral acceleration due to occurrence of tire slip angle (side slipping) as the vehicle speed increases.

Figure 3:
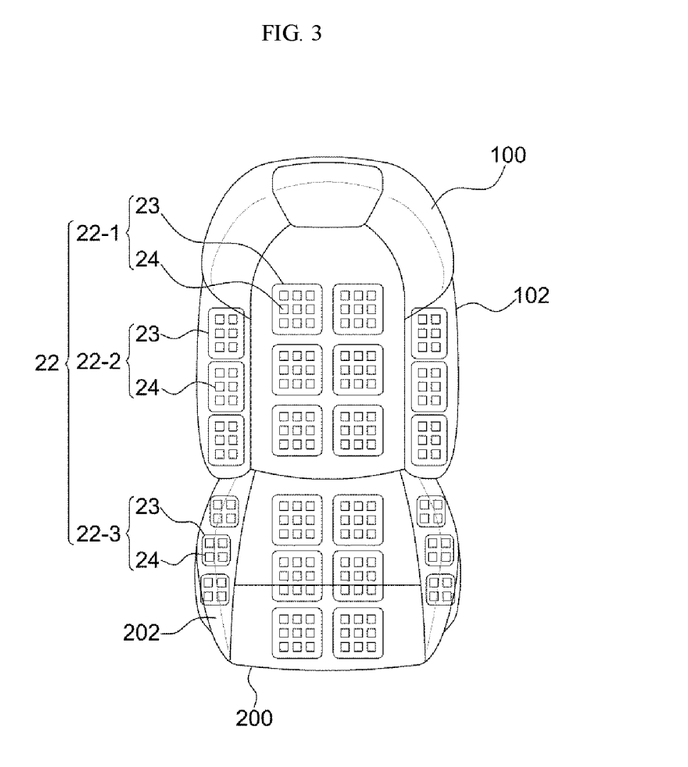
FIG. 3 is a schematic view illustrating an example with a body pressure sensing sensor embedded in the rotating type seat of the self-driving vehicle according to an exemplary embodiment of the present invention.

The measuring unit 20 may include a body pressure measuring sensor 22 mounted in a seat and configured to measure the amount of pressure exerted onto a seat back and a seat cushion including a bolster and a sensor configured to measure a seat rotation angle. In particular, the body pressure measuring sensor 22 may be embedded between a cover of the seat back and a foam pad, and as illustrated in the accompanying FIG. 3, may include a first body pressure measuring sensor 22-1 that is configured as a structure with a body pressure sensor 24 is attached to a flexible mat 23 in a 3×3 arrangement and that is embedded with one pair at upper, middle, and lower locations, respectively, on a front center portion of the seat back 100 and at the same time embedded with one pair at a front side and a rear side, respectively, on a center portion of the seat cushion 200; a second body pressure measuring sensor 22-2 that is configured as a structure with the body pressure sensor 24 is attached to the flexible mat 23 in a 2×3 arrangement and that is embedded with one pair at upper, middle, and lower locations, respectively, on a bolster 102 of both sides of a front surface of the seat back 100; and a third body pressure measuring sensor 22-3 that is configured as a structure with the body pressure sensor 24 is attached to the flexible mat 23 in a 2×2 arrangement and that is embedded at a front side and a rear side, respectively, on a bolster 202 of both sides of the seat cushion 200.

Additionally, a sensor configured to measure the seat rotation angle 22 may be a rotation angle sensor mounted on a rotation center shaft of the seat or surroundings thereof and may be configured to sense the rotation angle of the rotation center shaft, or may be a gyro sensor mounted on the seat and configured to sense azimuth variation of the seat, and besides, a motor rotation amount sensing sensor and the like configured to measure a rotation number and a rotation angle of a rotor embedded in the motor may be used.

Figure 8:
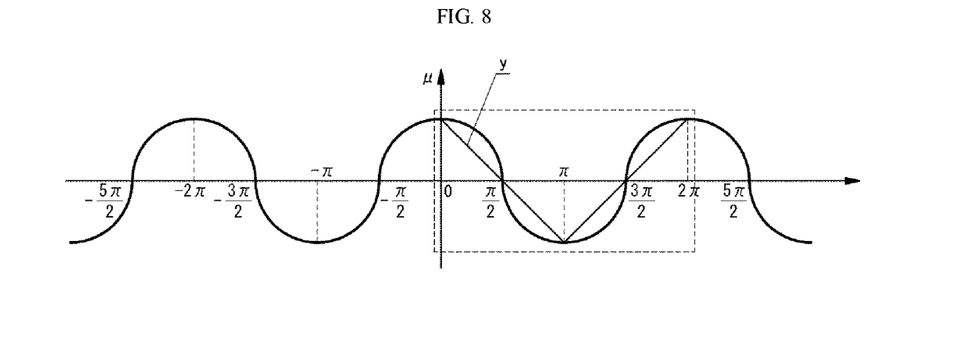
FIG. 8 is a graph illustrating that may implement linearization of the seat rotation angle in the turning phase determining unit of the system for controlling the rotating type seat of the self-driving vehicle according to an exemplary embodiment of the present invention.

In particular, in determining the seat rotation angle, |cos θ| of the angle may be varied and however, since a bolster body pressure occurrence rate of the seat back according to a centrifugal force may vary according to the seat rotation angle, as illustrated in the accompanying FIG. 8, the seat rotation angle may be converted into an angle (y) linearly varying according to a centrifugal force; and the seat rotation angle (y) linearly varying according to a centrifugal force may be obtained through Equation 1 as follows.

$$y = \begin{cases} -\dfrac{\theta}{\pi/2} + 1, & 0 \le \theta < \pi \\ \dfrac{\theta}{\pi/2} - 3, & \pi \le \theta < 2\pi \end{cases} \quad \text{Equation 1}$$

The body pressure information analyzing unit 30 may be configured to calculate the bolster body pressure occurrence rates of the seat back and the seat cushion based on body pressure information provided from the measuring unit 20. Additionally, the bolster body pressure occurrence rate of the seat back, when the body pressure sensing rate sensed in all of body pressure sensors embedded in the seat back including the bolster is 100%, may be calculated by a rate in which the body pressure sensing rate sensed in the body pressure sensor embedded in the bolster occupies; and the bolster body pressure occurrence rate of the seat cushion may be identically calculated as well. For example, the bolster body pressure occurrence rate of the seat back may be calculated by Equation 2 as follows.

$$\text{SEAT BACK BOLSTER PORTION BODY PRESSURE OCCURRENCE RATE}(\%) = \sum_{i=1}^{n} \dfrac{y_i}{x_i} \times 100 \quad \text{Equation 2}$$

In the Equation 2 above, xi refers to a body pressure sensed in all of body pressure sensors embedded in the seat back; yi refers to a body pressure sensed in the body pressure sensor embedded in the bolster thereof; and n refers to total number of the body pressure sensors.

The turning phase determining unit 40 may be configured to determine the turning degree of the self-driving vehicle as a plurality of phases using the corrected lateral acceleration calculated in the driving information analyzing unit 10, the seat rotation angle measured in the measuring unit 20, and the bolster body pressure occurrence rate of the seat back calculated in the body pressure information analyzing unit 30. In particular, the turning phase determining unit 40 may be configured to determine current driving status of a vehicle as Phase 0 (no turning), Phase 1 (proper turning), and Phase 2 (excessive turning) using three input information of the seat rotation angle, the corrected lateral acceleration, and the bolster body pressure occurrence rate and provide the information to a seat controller 50. For example, the Phase 2 may be related to a sharp turn.

Figure 7:
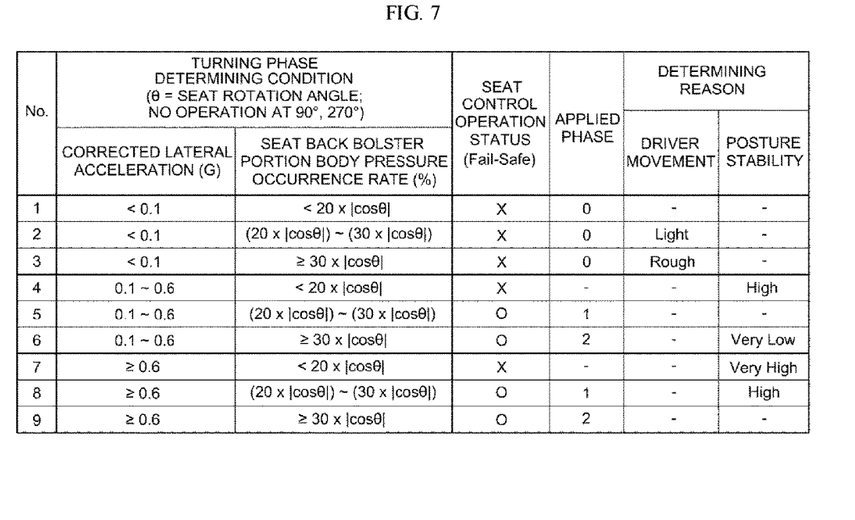
FIG. 7 is an exemplary table illustrating turning phase determining condition by a turning phase determining unit of the system for controlling the rotating type seat of the self-driving vehicle according to an exemplary embodiment of the present invention.

Turning phase determining conditions and turning phase determining examples by the turning phase determining unit 40 will be described with reference to the accompanying FIG. 7 as follows.

(1) When the corrected lateral acceleration is less than 0.1 and the bolster body pressure occurrence rate (%) of the seat back is less than 20% regardless of the seat rotation angle, the controller may be configured to determine that a centrifugal force and inertia upon turning are minimal to thus determine a current driving status of the vehicle as Phase 0 (no turning). Accordingly, the seat control operation may not be performed (e.g., the seat control remains in an original position).

(2) When the corrected lateral acceleration is less than 0.1 and the bolster body pressure occurrence rate (%) of the seat back is between (20×|cos θ|)~(30×|cos θ|) according to the seat rotation angle (θ), the controller may be configured to determine that the bolster body pressure increases slightly due to driver's minimal movement and a centrifugal force and inertia upon turning are minimal to determine a current driving status of the vehicle as Phase 0 (no turning) and the seat control operation may not be performed.

(3) When the corrected lateral acceleration is less than 0.1 and the bolster body pressure occurrence rate (%) of the seat back is more than (30×|cos θ|) according to the seat rotation angle (θ), the controller may be configured to determine that the bolster body pressure only increases instantaneously due to driver's movement and a centrifugal force and inertia upon turning are minimal to determine current driving status of the vehicle as Phase 0 (no turning) and the seat control operation may not be performed.

(4) When the corrected lateral acceleration is 0.1~0.6 and the bolster body pressure occurrence rate (%) of the seat back is less than 20% regardless of the seat rotation angle, the controller may be configured to determine that while the vehicle is turning, the bolster body pressure occurrence rate is low and thus stability of driver's posture is maintained, thereby not performing the seat control operation.

(5) When the corrected lateral acceleration is 0.1~0.6 and the bolster body pressure occurrence rate (%) of the seat back is between (20×|cos θ|)~(30×|cos θ|) according to the seat rotation angle (θ), the controller may be configured to determine that a centrifugal force and inertia upon turning change, thereby determining current driving status of the vehicle as Phase 1 (proper turning) and as described later, the controller may be configured to perform the seat control operation corresponding to Phase 1.

(6) When the corrected lateral acceleration is 0.1~0.6 and the bolster body pressure occurrence rate (%) of the seat back is greater than (30×|cos θ|) according to the seat rotation angle (θ), the controller may be configured to determine that stability of driver's posture is low due to a centrifugal force and inertia upon turning to determine current driving status of the vehicle as Phase 2 (excessive turning) and as described later, the controller may be configured to perform the seat control operation corresponding to Phase 2.

(7) When the corrected lateral acceleration is greater than 0.6 and the bolster body pressure occurrence rate (%) of the seat back is less than 20% regardless of the seat rotation angle, the controller may be configured to determine that while the vehicle is turning, the bolster body pressure occurrence rate is low and thereby stability of driver's posture may be maintained, thereby not performing the seat control operation.

(8) When the corrected lateral acceleration is greater than 0.6 and the bolster body pressure occurrence rate (%) of the seat back is between (20×|cos θ|)~(30×|cos θ|) according to the seat rotation angle (θ), the controller may be configured to determine that a centrifugal force and inertia upon turning change to determine a current driving status of the vehicle as Phase 1 (proper turning) and as described later, the controller may be configured to perform the seat control operation corresponding to Phase 1.

(9) When the corrected lateral acceleration is 0.6 and the bolster body pressure occurrence rate (%) of the seat back is greater than (30×|cos θ|) according to the seat rotation angle (θ), the controller may be configured to determine that stability of driver's posture is low due to a centrifugal force and inertia upon turning to determine current driving status of the vehicle as Phase 2 (excessive turning) and as described later, the controller may be configured to perform the seat control operation corresponding to Phase 2.

Thus, while describing total nine exemplary embodiments with respect to the turning phase determining condition and the turning phase determination by the turning phase determining unit 40, it may be possible to further subdivide the turning phase determining condition and the turning phase determination, thereby further increasing precision thereof.

Figure 2B:
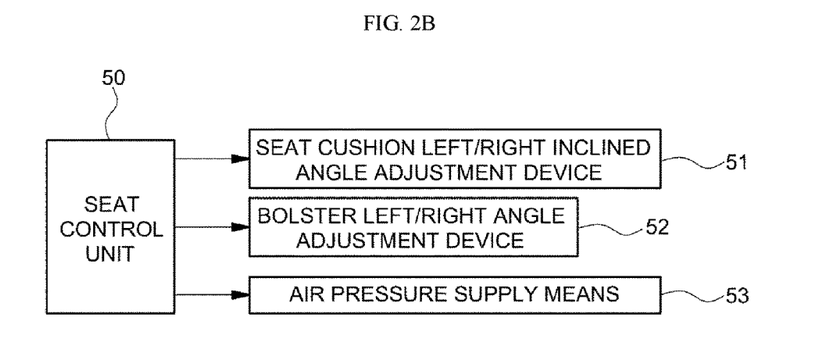
Figure 12:
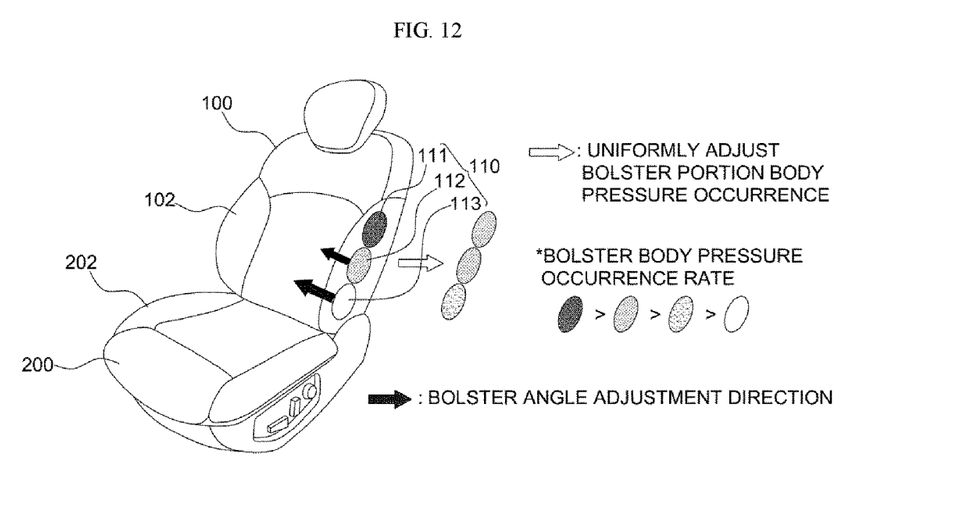

The seat controller 50 may be configured to operate the inclined angle of the seat cushion and the bolster volume and angle of the seat back according to the degree of turning determined in the turning phase determining unit 40. For this purpose, as illustrated in a configuration view of the accompanying FIG. 2b, an output portion of the seat controller 50 is connected with a seat cushion inclined angle adjustment device 51 (e.g., seat cushion left/right inclined angle adjustment device), a bolster angle adjustment device 52 (e.g., bolster left/right angle adjustment device, and an air pressure supply device 53 configured to apply a control signal thereto.

The seat cushion inclined angle adjustment device 51 may be configured to raise or lower one end portion of the seat cushion at a predetermined height using a motor, oil pressure, and the like as a power source; the bolster angle adjustment device 52 may be configured to adjust a protrusion angle of the bolster to be further toward passenger's body, may be applied as a known device applied to an electric seat; and the air pressure supply device 53 is also applied as a known device configured to adjust an air supply pressure on an air cell embedded in the bolster of the seat back. In particular, referring to the accompanying FIG. 12, an air cell 110 embedded in the bolster 102 of the seat back 100, as illustrated in the accompanying FIG. 12, may be divided into an upper air cell 111, a middle air cell 112, and a lower air cell 113; and each air cell may be connected with an air pressure supply device and thereby an air supply pressure may be adjusted.

Accordingly, when the seat controller 50 receives Phase 0 (no turning) from the turning phase determining unit 40, the inclined angle of the seat cushion and the bolster volume and angle of the seat back may be maintained in an original position (e.g. not adjusted). In addition, in response to receiving Phase 1 (proper turning) or Phase 2 (excessive turning), of the controller may be configured to adjust the left/right inclined angle of the seat cushion and the bolster volume and angle of the seat back.

Figure 9:
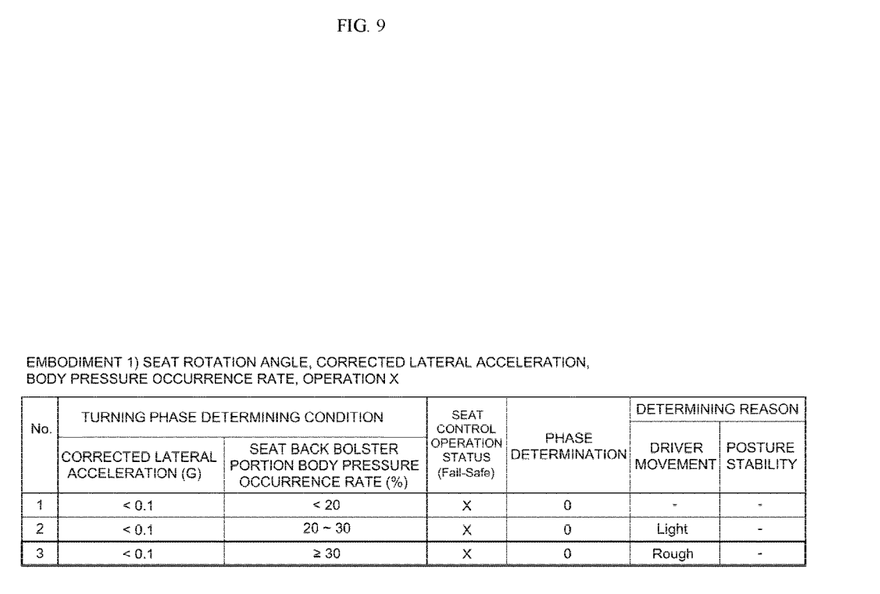
FIGS. 9 and 10 are exemplary tables illustrating embodiments that determine a turning phase in the turning phase determining unit of the system for controlling the rotating type seat of the self-driving vehicle according to an exemplary embodiment of the present invention.

Referring to the accompanying FIG. 9, when the seat rotation angle=0° (cos 0°=1), the corrected lateral acceleration is 0.05 g, and the bolster body pressure occurrence rate of the seat back is 35%, the bolster body pressure may instantaneously increase (3) due to driver's movement among the examples of the turning phase determining condition and the turning phase determination (referring to FIG. 7), thereby not performing a control for adjustment of the left/right inclined angle of the seat cushion and the bolster volume and angle of the seat back.

Figure 10:
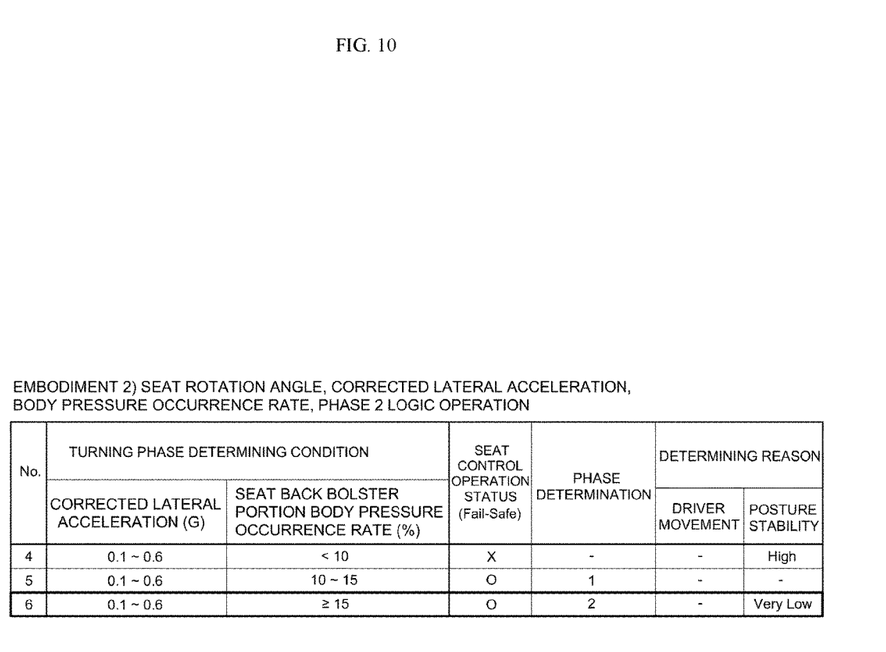

Referring to the accompanying FIG. 10, when the seat rotation angle=60° (cos 60°=½), the corrected lateral acceleration is 0.45 g, and the bolster body pressure occurrence rate of the seat back is 20%, the turning phase may be determined as Phase 2 (excessive turning) and a control for adjustment of the left/right inclined angle of the seat cushion and the bolster volume and angle of the seat back may be executed.

Figure 11:
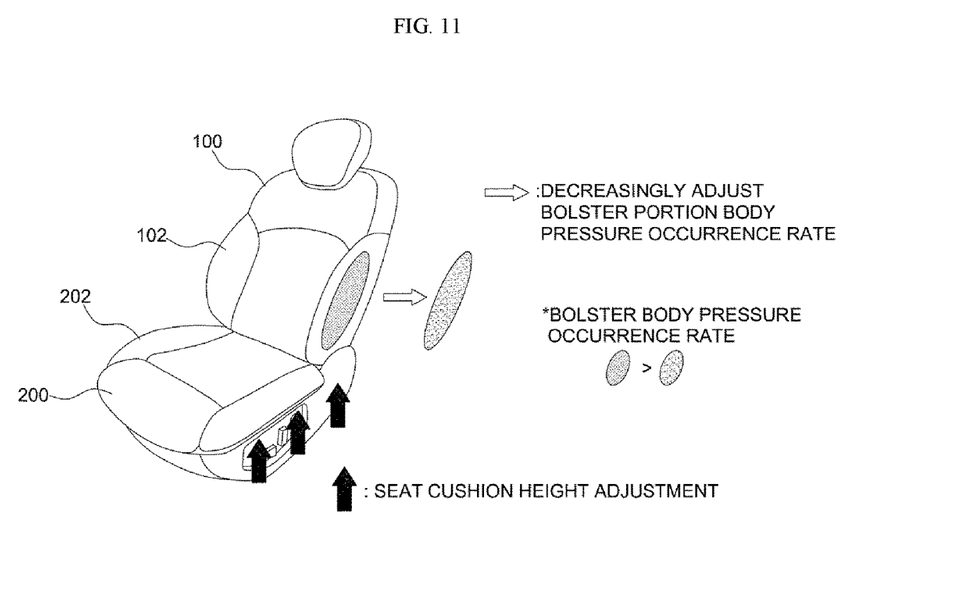
FIGS. 11 and 12 are schematic views illustrating examples that left/right inclined angles of a seat cushion and bolster volume and angle of a seat back are adjusted by a seat controller of the system for controlling the rotating type seat of the self-driving vehicle according to an exemplary embodiment of the present invention.

For example, when the seat controller 50 receives Phase 1 (proper turning) or Phase 2 (excessive turning), control signal may be applied to the seat cushion left/right inclined angle adjustment device 51 and as illustrated in the accompanying FIG. 11, the controller may be configured to raise one end portion of the seat cushion 200 applied with body pressure, thereby decreasingly adjusting the body pressure occurrence rate (e.g., passenger's body pressure occurrence rate operating on the bolster while being displaced to one side due to a centrifugal force) and eventually providing stable posture and stable seating feeling to a passenger including a driver.

With this configuration, the seat controller 50 may be configured to apply a control signal to the bolster left/right angle adjustment device 52 embedded in the bolster 102 of the seat back 100 and as illustrated in the accompanying FIG. 12, execute the angle adjustment control of the bolster 102 in an opposite direction applied with body pressure; and at the same time, apply a control signal to the air pressure supply device configured to supply air pressure to a plurality of air cells 110 embedded in the bolster 102 and uniformly perform pressure adjustment for each air cell 110 at a predetermined rate.

Accordingly, for the bolster 102 of the seat back 100 to provide support when a passenger is displaced due to a centrifugal force, air pressure on the upper air cell 111, the middle air cell 112, and the lower air cell 113 may be uniformly adjusted to prevent certain portions of the body from being under pressure, thereby providing more stable posture and seating feeling to the passenger.

Figure 13:
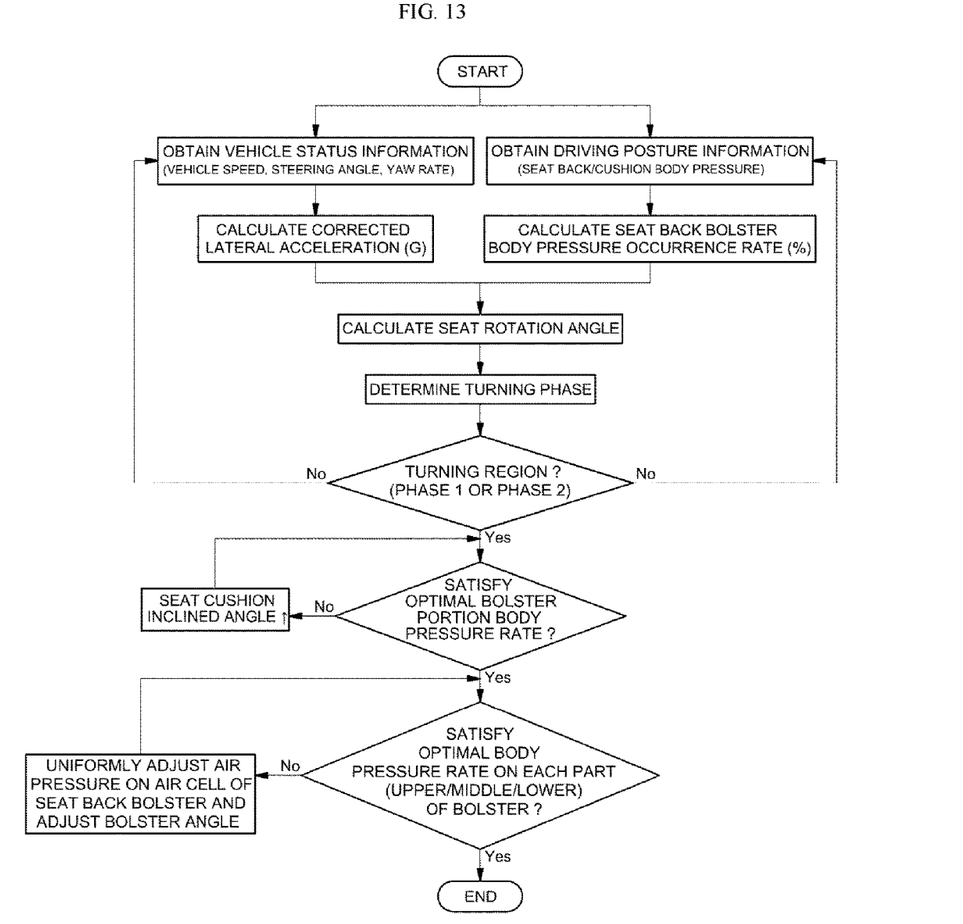
FIG. 13 is a flowchart illustrating a method for controlling the rotating type seat of the self-driving vehicle according to an exemplary embodiment of the present invention.

Herein, a method for controlling the rotating type seat according to the present invention based on the above configuration will be sequentially described again with reference to a flowchart of the accompanying FIG. 13. The method described herein below may be executed by a controller. First, the driving information analyzing unit 10 may be configured to obtain current information of the vehicle speed, the steering angle, and the yaw rate of the self-driving vehicle and calculate the corrected lateral acceleration; and the detailed description calculating the corrected lateral acceleration is as described above.

With this configuration, as described above, the measuring unit 20 may be configured to measure passenger's body pressure exerted onto the seat back and the seat cushion from the body pressure measuring sensor mounted on the seat and may be configured to detect and measure the seat rotation angle. Further, as described above, the body pressure information analyzing unit 30 may be configured to calculate the bolster body pressure occurrence rates of the seat back and the seat cushion based on the body pressure information measured in the measuring unit 20.

Further, the turning phase determining unit 40 may be configured to determine the degree of turning of the self-driving vehicle using information of the seat rotation angle, the corrected lateral acceleration, and the bolster body pressure occurrence rate and determine current degree of turning of the vehicle as Phase 0 (no turning), Phase 1 (proper turning), and Phase 2 (excessive turning) to provide the information to the seat controller 50. In particular, as described above, while the turning phase determining condition and the turning phase determination by the turning phase determining unit 40 are classified as total nine exemplary embodiments, it may be possible to further subdivide the turning phase determining condition and the turning phase determination.

When the seat controller 50 receives the degree of turning determined in the turning phase determining unit 40, that is, in response to receiving the degree of turning of Phase 1 (proper turning) or Phase 2 (excessive turning), the controller may be configured to adjust the left/right inclined angle of the seat cushion and the bolster volume and angle of the seat back.

When the seat controller 50 receives Phase 1 (proper turning), the controller 50 may be configured to adjust the left/right inclined angle of the seat cushion and the bolster volume and angle of the seat back to decrease current body pressure occurrence rates operating on the bolster portion of the seat back and the seat cushion to less than a first threshold bolster body pressure occurrence rate. In particular, the first threshold body pressure occurrence rate on the bolster portion of the seat back and the first threshold body pressure occurrence rate on the bolster portion of the seat cushion, respectively, may be obtained by inputting current lateral acceleration to a regression equation in statistics.

More specifically, the first threshold body pressure occurrence rate on the bolster portion of the seat back may be set as a range of a minimum 20% to a maximum 50% through the regression equation in statistics [ex. (60×lateral acceleration (0.1~0.6)+14)×|cos θ|)]; and the first threshold body pressure occurrence rate on the bolster portion of the seat cushion may be set as a range of a minimum 20% to a maximum 30% through the regression equation in statistics [ex. (20×lateral acceleration (0.1~0.6)+18)×|cos θ|)].

Accordingly, when the seat controller 50 receives Phase 1 (proper turning) from the turning phase determining unit 40, the controller 50 may be configured to adjust the left/right inclined angle of the seat cushion and the bolster volume and angle of the seat back and controls to decrease current body pressure occurrence rates operating on the bolster portions of the seat back and the seat cushion to be less than the first threshold bolster body pressure occurrence rate varying according to the lateral acceleration.

Thus, when the seat controller 50 receives Phase 1 (proper turning), the controller 50 may be configured to apply a control signal to the seat cushion left/right inclined angle adjustment device 51 and as illustrated in the accompanying FIG. 11, perform a control for raising one end portion of the seat cushion 200 applied with body pressure, thereby decreasingly adjusting the body pressure occurrence rate (passenger's body pressure rate operating on the bolster while being displaced to one side due to a centrifugal force) applied to the bolster of the seat back to be less than the first threshold bolster body pressure occurrence rate.

With this configuration, when the seat controller 50 receives phase 1 (proper turning), the controller 50 may be configured to apply a control signal to the bolster left/right angle adjustment device 52 embedded in the bolster 102 of the seat back 100 and as illustrated in the accompanying FIG. 12, perform a control for adjusting an angle of the bolster 102 in an opposite direction applied with body pressure, thereby more easily, decreasingly adjusting the body pressure occurrence rate (passenger's body pressure rate operating on the bolster while being displaced to one side due to a centrifugal force) applied to the bolster of the seat back to be less than the first threshold bolster body pressure occurrence rate.

Further, when the seat controller 50 receives Phase 1 (proper turning), the controller 50 may be configured to apply a control signal to the air pressure supply device and perform a control for uniformly performing pressure adjustment on each air cell 110 embedded in the bolster at a predetermined rate; and when a passenger is displaced due to a centrifugal force, the controller 50 may be configured to adjust air pressure on the upper air cell 111, the middle air cell 112, and the lower air cell 113 to be a rate of 4:3:3, thereby preventing certain portions of body from being under pressure and eventually providing a more stable posture and seating feeling to the passenger.

In particular, each air pressure on front, middle, and rear air cells embedded in the bolster of the seat cushion may be adjusted at a rate of 4:4:2. When that the seat controller 50 receives Phase 2 (excessive turning), the controller 50 may be configured to adjust the left/right inclined angle of the seat cushion and the bolster volume and angle of the seat back to decrease current body pressure occurrence rates operating on the bolster portions of the seat back and the seat cushion to be less than a second threshold body pressure occurrence rate.

In addition, when passenger's body pressure exerted on the bolster portion when the vehicle turns increases, since instability of posture increase, the second threshold bolster body pressure occurrence rate on the bolster portion of the seat back may be set as a maximum 50% and the second threshold bolster body pressure occurrence rate on the bolster portion of the seat cushion may be set as 30%.

Accordingly, when the seat controller 50 receives Phase 2 (excessive turning), the controller 50 may be configured to apply a control signal to the seat cushion left/right angle adjustment device 51 and as illustrated in the accompanying FIG. 11, perform a control for raising one end portion of the seat cushion 200 applied with body pressure, thereby decreasingly adjusting the body pressure occurrence rate (passenger's body pressure rate operating on the bolster while being displaced to one side due to a centrifugal force) applied to the bolster of the seat back to be less than the second threshold bolster body pressure occurrence rate.

With this configuration, when the seat controller 50 receives Phase 2 (excessive turning), the controller 50 may be configured to apply a control signal to the bolster left/right angle adjustment device 52 embedded in the bolster 102 of the seat back 100 and as illustrated in the accompanying FIG. 12, perform a control for adjusting an angle of the bolster 102 in an opposite direction applied with body pressure, thereby more easily, decreasingly adjusting the body pressure occurrence rate (e.g., passenger's body pressure rate operating on the bolster while being displaced to one side due to a centrifugal force) applied to the bolster of the seat back to be less than the second threshold bolster body pressure occurrence rate.

Further, when the seat controller 50 receives Phase 2 (excessive turning), the controller 50 may be configured to apply a control signal to the air pressure supply device and perform a control for uniformly performing pressure adjustment on each air cell 110 embedded in the bolster at a predetermined rate; and when a passenger is displaced due to a centrifugal force, the controller 50 may be configured to adjust air pressure on the upper air cell 111, the middle air cell 112, and the lower air cell 113 to be a rate of 4:3:3, thereby preventing certain portion of body from being under pressure and eventually providing a more stable posture and seating feeling to the passenger.

As described above, at the status that the seat of the self-driving vehicle is rotationally adjusted in passenger's desired direction, it may be possible to adjust seat position and bolster volume according to the seat rotation angle, the corrected lateral acceleration, and the bolster body pressure occurrence rate, thereby supporting and minimizing body displacement due to a centrifugal force and inertia and eventually, providing a stable seating feeling to the passenger regardless of the rotated direction of the seat upon turning driving of the self-driving vehicle.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A system for controlling a rotating type seat of a self-driving vehicle, comprising:
    a driving information analyzing unit configured to obtain vehicle information and calculate a corrected lateral acceleration;
    a measuring unit configured to measure pressure exerted onto a seat back and a seat cushion using a sensor and configured to measure a seat rotation angle;
    a body pressure information analyzing unit configured to measure bolster body pressure occurrence rates of the seat back and the seat cushion based on pressure information from the measuring unit;
    a turning phase determining unit configured to determine a turning degree the vehicle using the seat rotation angle, the corrected lateral acceleration, and the bolster body pressure occurrence rate; and
    a seat controller configured to adjust an inclined angle of the seat cushion and bolster volume and angle of the seat back based on the turning degree.

2. The system for controlling the rotating type seat of the self-driving vehicle of claim 1, wherein the sensor is embedded between a cover of the seat back and a foam pad and includes:
    a first body pressure measuring sensor that is configured as a structure that a body pressure sensor is attached to a flexible mat in a 3×3 arrangement and that is embedded with one pair at upper, middle, and lower locations, respectively, on a front center portion of the seat back and embedded with one pair at a front side and a rear side, respectively, on a center portion of the seat cushion;
    a second body pressure measuring sensor that is configured as a structure that the body pressure sensor is attached to the flexible mat in a 2×3 arrangement and that is embedded with one pair at upper, middle, and lower locations, respectively, on bolsters of both sides of a front surface of the seat back; and
    a third body pressure measuring sensor that is configured as a structure that the body pressure sensor is attached to the flexible mat in a 2×2 arrangement and that is embedded at a front side and a rear side, respectively, on bolsters of both sides of the seat cushion.

3. The system for controlling the rotating type seat of the self-driving vehicle of claim 1, wherein the seat rotation angle is measured using a rotation angle sensing sensor mounted on a rotation center shaft of a seat or surroundings thereof and configured to sense a rotation angle of the rotation center shaft, or is measured using a gyro sensor mounted on the seat and configured to sense azimuth variation of the seat.

4. The system for controlling the rotating type seat of the self-driving vehicle of claim 1, wherein the turning phase determining unit determines current driving status of a vehicle as Phase 0 (no turning), Phase 1 (proper turning), and Phase 2 (excessive turning) using the seat rotation angle, the corrected lateral acceleration calculated using current information of a vehicle speed, a steering angle, and a yaw rate, and the bolster body pressure occurrence rate.

5. The system for controlling the rotating type seat of the self-driving vehicle of claim 4, wherein the seat controller, in response to receiving Phase 1 (proper turning) or Phase 2 (excessive turning), is configured to apply a control signal to an inclined angle adjustment device of the seat cushion and raise one end portion of the seat cushion applied with body pressure.

6. The system for controlling the rotating type seat of the self-driving vehicle of claim 4, wherein the seat controller, in response to receiving Phase 1 (proper turning) or Phase 2 (excessive turning), is configured to apply a control signal to a bolster angle adjustment device embedded in the bolster of the seat back and perform angle adjustment of the bolster in an opposite direction applied with body pressure; and at the same time, apply a control signal to an air pressure supply device configured to supply air pressure to a plurality of air cells embedded in the bolster and perform pressure adjustment on each air cell.

7. A method for controlling a rotating type seat of a self-driving vehicle, comprising:
   calculating, by a controller, a corrected lateral acceleration;
   measuring, by the controller, pressure exerted onto a seat back and a seat cushion and measuring a seat rotation angle;
   calculating, by the controller, bolster body pressure occurrence rates of the seat back and the seat cushion based on pressure information;
   determining, by the controller, a turning degree of the vehicle using the seat rotation angle, the corrected lateral acceleration, and the bolster body pressure occurrence rate and determining a current degree of turning of the vehicle as Phase 0 (no turning), Phase 1 (proper turning), and Phase 2 (excessive turning) to provide it to a seat controller; and
   v) in the seat controller, adjusting an inclined angle of the seat cushion and bolster volume and angle of the seat back based on the turning degree.

8. The method for controlling the rotating type seat of the self-driving vehicle of claim 7, wherein the corrected lateral acceleration is calculated by obtaining current information of a vehicle speed, a steering angle, and a yaw rate, and after multiplying the vehicle speed and the yaw rate to calculate an estimated lateral acceleration, is obtained by multiplying the calculated estimated lateral acceleration by a correction factor; and the correction factor is obtained by dividing the estimated lateral acceleration by the actually measured lateral acceleration.

9. The method for controlling the rotating type seat of the self-driving vehicle of claim 7, wherein the bolster body pressure occurrence rate of the seat back when a body pressure sensing rate sensed in all of body pressure sensors embedded in the seat back is 100%, is calculated by a rate that the sensed body pressure sensing rate occupies.

10. The method for controlling the rotating type seat of the self-driving vehicle of claim 7, wherein when the seat controller receives Phase 0 (no turning), a seat control is maintained.

11. The method for controlling the rotating type seat of the self-driving vehicle of claim 7, wherein when the seat controller receives Phase 1 (proper turning), the inclined angle of the seat cushion and the bolster volume and angle of the seat back are adjusted to decrease current body pressure occurrence rates operating on the bolster portions of the seat back and the seat cushion to be less than a first threshold bolster body pressure occurrence rate varying based on a lateral acceleration.

12. The method for controlling the rotating type seat of the self-driving vehicle of claim 11, wherein the first threshold bolster body pressure occurrence rate on the bolster portion of the seat back and the first threshold bolster body pressure occurrence rate on the bolster portion of the seat cushion are obtained by inputting current lateral acceleration to a regression equation in statistics, respectively; and the first threshold bolster body pressure occurrence rate on the bolster portion of the seat back is set as a range of a minimum 20% to a maximum 50% according to the lateral acceleration and the first threshold bolster body pressure occurrence rate on the bolster portion of the seat cushion is set as a range of a minimum 20% to a maximum 30% according to the lateral acceleration.

13. The method for controlling the rotating type seat of the self-driving vehicle of claim 11, wherein the inclined angle of the seat cushion is adjusted by a control for raising one end portion of the seat cushion applied with body pressure; the bolster angle adjustment of the seat back is performed by adjusting an angle of the bolster in an opposite direction applied with body pressure; and the bolster volume adjustment of the seat back is performed by adjusting air pressure on a plurality of air cells embedded in the bolster at a predetermined rate.

14. The method for controlling the rotating type seat of the self-driving vehicle of claim 7, wherein when the seat controller receives Phase 2 (excessive turning), the inclined angle of the seat cushion and the bolster volume and angle of the seat back are adjusted to decrease current body pressure occurrence rates operating on the bolster portions of the seat back and the seat cushion to be less than a second threshold bolster body pressure occurrence rate.

15. The method for controlling the rotating type seat of the self-driving vehicle of claim 14, wherein the second threshold bolster body pressure occurrence rate on the bolster portion of the seat back is set as 50% and the second threshold bolster body pressure occurrence rate on the bolster portion of the seat cushion is set as 30%.

16. The method for controlling the rotating type seat of the self-driving vehicle of claim 14, wherein the inclined angle of the seat cushion is adjusted by a control for raising one end portion of the seat cushion applied with body pressure; the bolster angle adjustment of the seat back is performed by adjusting an angle of the bolster in an opposite direction applied with body pressure; and the bolster volume adjustment of the seat back is performed by adjusting air pressure on a plurality of air cells embedded in the bolster at a predetermined rate.

* * * * *